United States Patent [19]

Nagata et al.

[11] 4,196,523

[45] Apr. 8, 1980

[54] METHOD OF CENTERING HOLLOW CYLINDRICAL WORKPIECE

[75] Inventors: Kazuto Nagata; Hiroaki Himeno; Hironari Okitomo; Hiroshi Hatakeyama; Kazunori Tsuruta; Itsuo Murata, all of Hiroshima; Keiichi Kobayashi, Yokohama; Shigetaka Hosaka, Tokyo; Katsumasa Hironaka; Osamu Torii, both of Osaka, all of Japan

[73] Assignees: Mitsubishi Jukogyo Kabushiki Kaisha, Tokyo; Sumitomo Metal Industries Limited, Osaka, both of Japan

[21] Appl. No.: 870,718

[22] Filed: Jan. 19, 1978

[30] Foreign Application Priority Data

Feb. 7, 1977 [JP] Japan ................................. 52-12293

[51] Int. Cl.² .............................................. G01B 7/31
[52] U.S. Cl. ................................ 33/185 R; 33/169 C
[58] Field of Search ............ 33/185 R, 169 C, 172 D, 33/174 Q, 174 P, 178 R, 178 E, 180 K

[56] References Cited

U.S. PATENT DOCUMENTS

| 3,432,932 | 3/1969 | Oellerich et al. ................. 33/169 C |
| 3,442,478 | 5/1969 | Parapetti ........................... 33/172 D |

Primary Examiner—Willis Little
Attorney, Agent, or Firm—Toren, McGeady and Stanger

[57] ABSTRACT

A method of centering a hollow cylindrical piece of work comprises measuring the outside and inside diameters and contours of the work by means of outside- and inside-diameter-measuring instruments relative to the common centerline of the instruments taken as the virtual center of the work, inputting the measured values with corrections made for any deflection of the work and for any error arising from the instruments, to an electronic computer, and allowing the computer to memorize the information and operate to find the real center of the hollow cylindrical work on the basis of the stored information, whereby the location of the real center and machining allowances necessary for obtaining a product finished to the desired contours can be be computed.

1 Claim, 8 Drawing Figures

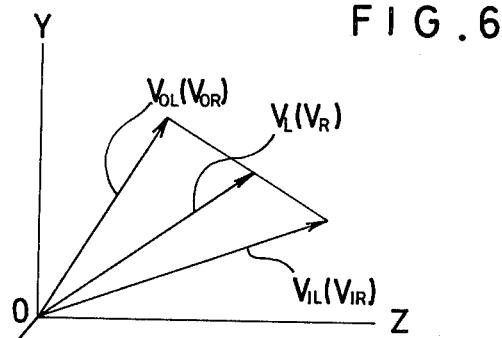
FIG. 6
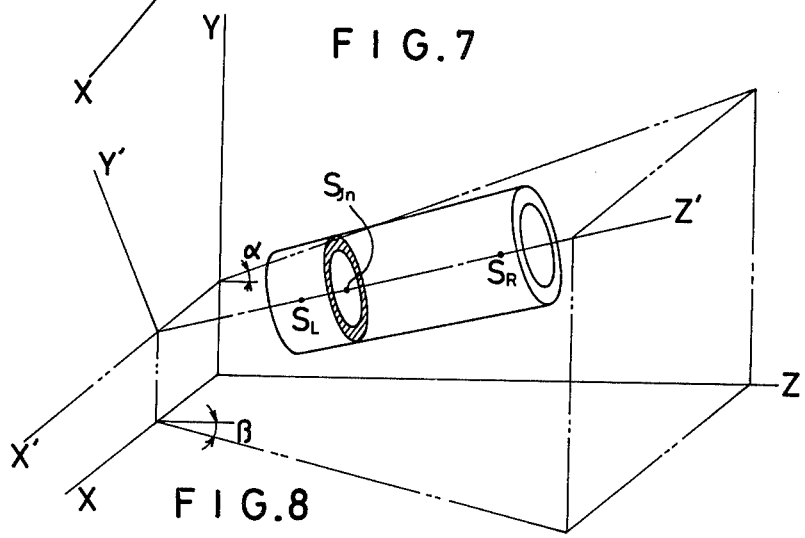
FIG. 7
FIG. 8
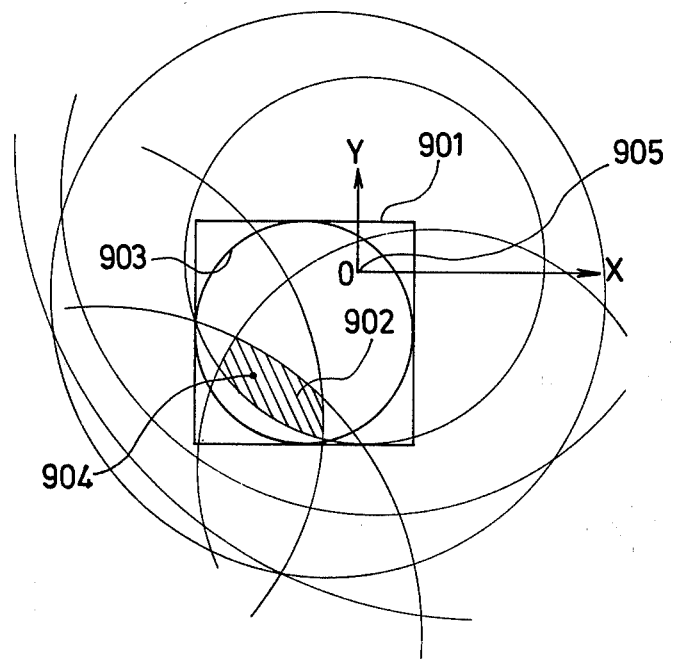

METHOD OF CENTERING HOLLOW CYLINDRICAL WORKPIECE

This invention relates to centering of a hollow cylindrical piece of work to be turned in a lathe or the like.

Locating the centers of workpieces for the machining purposes has usually been done manually with sense of location based on experience of the operator. Naturally the centers so chosen are sometimes out of true, making it impossible to obtain products machined as desired. If it is possible, the uneven machining allowances can seriously impair the cutting tool performance and result in unsatisfactory products. Moreover, it is often the case with the manual centering that a stock too large for the finished piece is required. For these and other reasons the machining operations give articles of low qualities in poor yields due to the cutting under adverse conditions, and take much time for turning off extra metal.

The present invention aims at eliminating these disadvantages and providing a method of centering a hollow cylindrical piece of work which comprises measuring the outside and inside diameters and contours of the work by means of outside- and inside-diameter-measuring instruments relative to the common centerline of the instruments taken as the virtual center of the work, inputting the measured values, with corrections made for any deflection of the work and for any error arising from the instruments, to an electronic computer, and allowing the computer to memorize the information and operate to find the real center of the work on the basis of the stored information, whereby the location of the real center and machining allowances necessary for obtaining a product finished to the desired contours can be computed.

The invention will now be more fully described with reference to the accompanying drawings showing an embodiment thereof. In the drawings:

FIG. 6 is a view explanatory of the way in which a secondary virtual line is located;

FIG. 7 is a view explanatory of transformation of the secondary virtual center into a Z-axis; and FIG. 8 is a view explanatory of finding the real center from the secondary virtual center.

Figure 1:
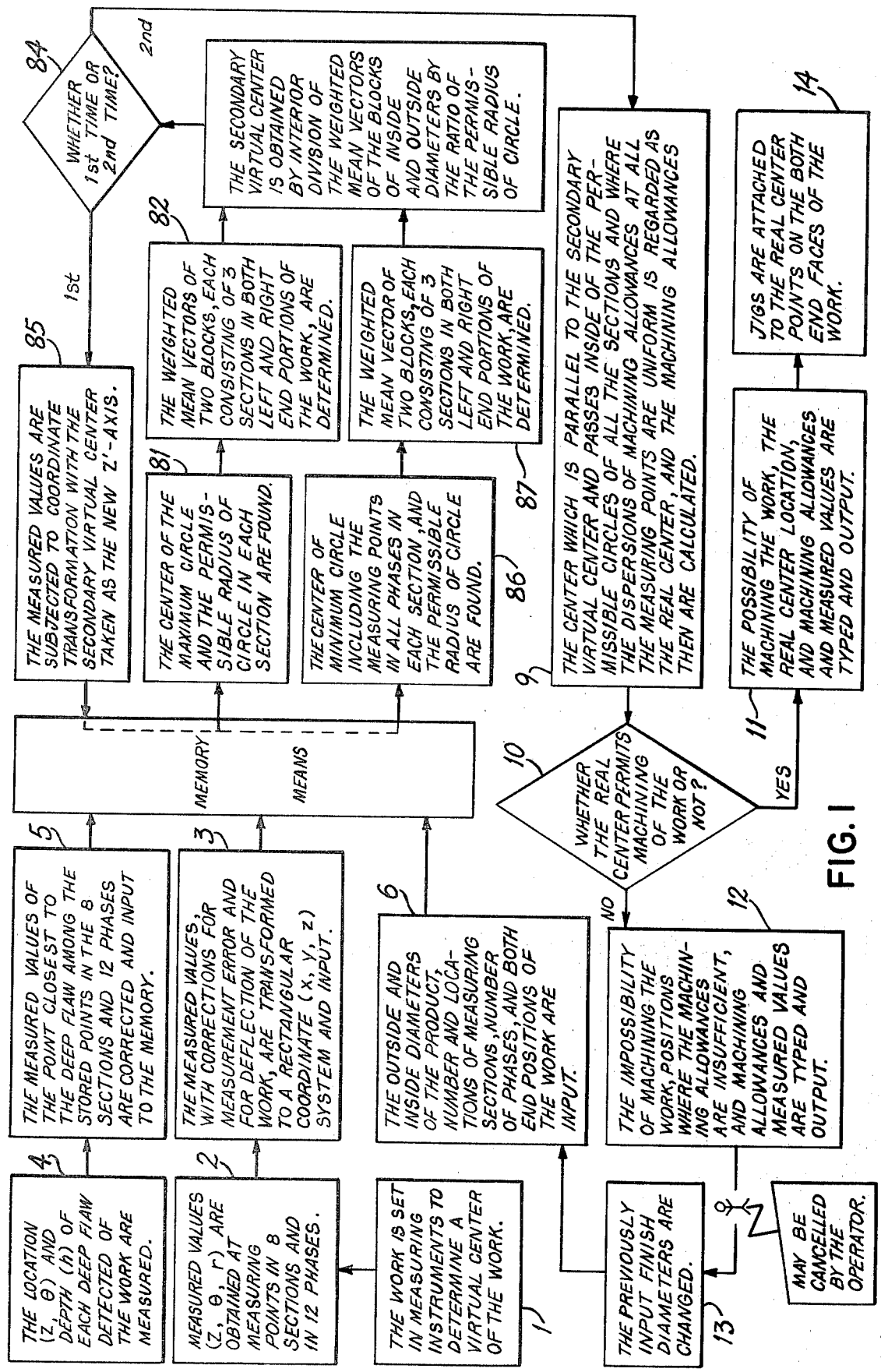
FIG. 1 is a flow sheet of an embodiment of the invention.

Referring to FIG. 1, the numeral 1 indicates the first stage of the method in which a hollow cylindrical work is set in position relative to outside- and inside-diameter-measuring instruments to locate the virtual center of the work.

Figure 2:
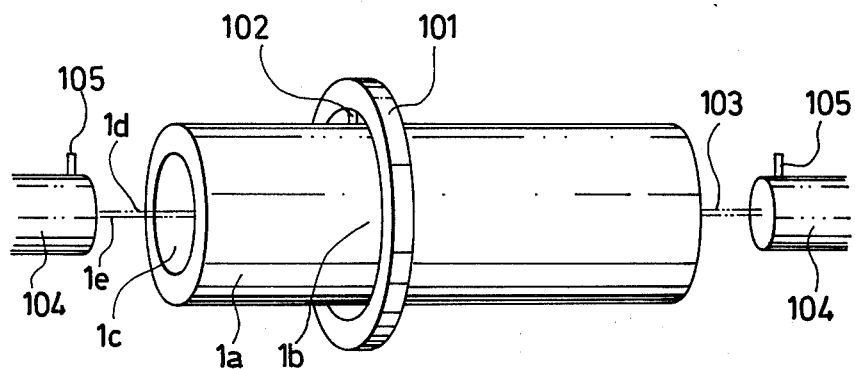
FIG. 2 is a perspective view of a work the outside and inside diameters of which are being measured.

The outside-diameter-measuring instrument 101, as shown in FIG. 2, surrounds the work 1a and revolves around the work and also about its own centerline 103, for example, with its contactor 102 in sliding contact with the outer surface 1b of the work 1a. At the same time, it moves axially, so that the outside diameter of the work 1a at each measuring point can be determined from the radial displacement of the contactor 102. This outside-diameter-measuring instrument 101 may be of whatever type else provided it is capable of measuring the outside diameter of the work 1a on the basis of the axis of the instrument itself.

The inside-diameter-measuring instruments 104, as shown in FIG. 2, are disposed so that they can enter the hollow of the work 1a from the both ends. Each of the instruments 104 rotates within the hollow of the work and also about its own centerline 103 (concentrically with the outside-diameter-measuring instrument 104), for example, with its contactor 105 in sliding contact with the inner surface 1c of the work 1a. At the same time, it moves axially, so that the inside diameter of the work 1a at each measuring point can be determined from the radial displacement of the contactor 105. This inside-diameter-measuring instrument 104 may be of any other type provided it is capable of measuring the inside diameter of the work 1a on the basis of the axis of the instrument itself.

In FIG. 2, 103 is the common centerline of the outside- and inside-diameter-measuring instruments 101, 104, or the locus along which the centers of the outside- and inside-diameter-measuring instruments 101, 104 travel longitudinally (hereinafter referred to as "in the direction Z"). Here it is assumed to be the imaginary or virtual center 1d of the work 1a. The real center 1e of the work 1a is not coincident with the virtual center 1d. According to this invention, the location of the real center 1e and the machining allowances for obtaining a finished product from the stock are determined from the outside and inside diameters measured of the work on the basis of the virtual center 1d.

Figure 3:
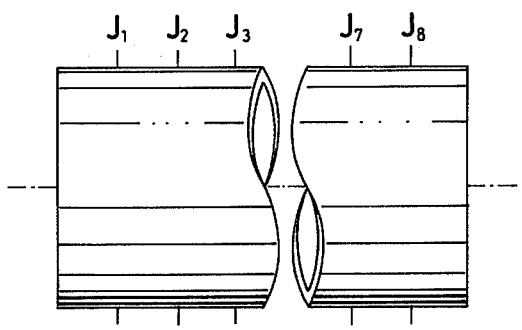
FIG. 3 is a front view of a work as divided by measuring sections.
Figure 4:
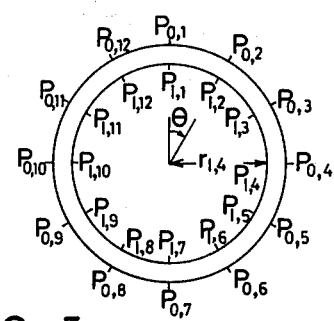
FIG. 4 is a cross sectional view taken on the line A—A of FIG. 3 and as divided by measuring phases.

In Stage 2, measured values (Z, θ, r) are obtained at measuring points in eight sections and twelve phases ($P_{O,1}$–$P_{O,12}$, $P_{I,1}$–$P_{I,12}$). The measuring points lie in each of eight cross sections ($J_1$–$J_8$) of the work as shown in FIG. 3, at 24 points as shown in FIG. 4. The measurements at a total of 192 points are taken by means of the outside- and inside-diameter-measuring instruments 101, 104 in terms of the coordinate values (Z, θ, r) in a system of circular cylindrical coordinates with the virtual center as the Z-axis, the circumferential direction as the θ-axis, and the radial direction as the r-axis.

In Stage 3, the measured values (Z, θ, r) obtained with the inside- and outside-diameter-measuring instruments 101, 104 are corrected for errors of the instruments themselves and for deflection of the work due to setting. The measured values are then transformed to a rectangular system of coordinates with the virtual center as the Z-axis, the horizontal direction as the X-axis, and the vertical direction as the Y-axis, and then are stored as such in real time in memory means (hereinafter called a "memory").

Figure 5:
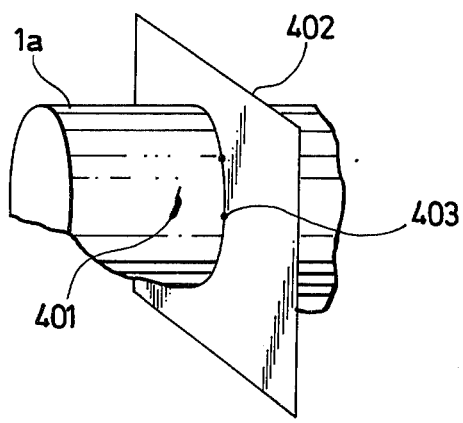
FIG. 5 is a perspective view of a work with a deep flaw.

Stage 4, as illustrated in FIG. 5, is for visually inspecting the work surface to detect any deep flaw 401 that could not be located in Stage 2, and to measure the depth of the flaw. On the basis of the location and depth of any defect measured, the values at the measuring points in the phase 403 in the nearest section 402 are corrected. In this manner the particular deep flaw can be taken into account in the computation for centering.

In Stage 5 the location (Z, θ) and depth (h) of the phase 403 to be corrected in consideration of the deep flaw detected are stored in the memory. In this case the coordinates of the phase 403 so corrected are (Z, θ, r-h).

As indicated in Stage 6, before the measurements are taken, the outside and inside diameters to which the work is to be finished, number and locations of the measuring sections, both end positions of the work, and modes of measurement (continuous/intermittent) of the measuring instruments are all input to the memory.

Stage 7 indicates the means for storing the information on the shapes of the work and finished product.

In the ensuing stage, or in Substages 81 through 87, a secondary virtual center is found by operations.

In Substage 81, regarding the outside diameter of the work $1a$, the center of the maximum circle obtainable within a dodecagon formed by connecting the measuring points ($P_{O,1}$-$P_{O,12}$) in the 12 phases of each section, its vector, and the radius of a circle which permits the choice of the real center position (the radius being hereinafter referred to as the "permissible radius of circle") are found to obtain a secondary virtual center. The calculation procedure will now be explained.

(a) In each of J sections ($J_1$-$J_8$), the center of gravity is first determined as the means of coordinate values at the measuring points $P_{O,1}$-$P_{O,12}$ in 12 phases. A total of eight gravity-center coordinates, one for each section, are obtained.

(b) In case where a product having an outside or inside diameter of about one meter is to be obtained, (9×9) points are provided in a lattice pattern at intervals of 5 mm over an area 40 mm by 40 mm about the center of gravity. The distance from each intersection of the lattice to each phase is found. Thus, from each lattice point twelve different distances are obtained. They form one group, and a total of 81 groups are obtained per section. Then, the minimum distances of the respective groups are compared, and the lattice point of the maximum distance is found. A total of eight such lattice points are found in the sections, one for each section.

(c) Over an area 5 mm by 5 mm about each lattice point (one per section) located in (b) above, (11×11) points are set in a lattice pattern at intervals of 0.5 mm. By the same procedure as followed in (b) above, only one lattice point is found per section. Therefore, a total of eight such lattice points are obtained.

(d) The coordinate value of the lattice point found in (c) above substantially coincides with the center of the maximum circle obtainable in the particular section and is taken as a vector $V_{O,Jn}(x_{O,Jn}, y_{O,Jn}, z_{O,Jn})$. A total of eight center vectors are obtained, one for each section.

(e) The permissible radius of circle is taken as a value $R_{O,Jn}$ obtained by subtracting the outer radius of the finished piece from the radius of the maximum circle. A total of eight permissble radii are obtained, one for each section. Where the $R_{O,Jn}$ is minus or zero, it is regarded as "1" for the convenience of calculation.

These calculations are all performed by an electronic computer.

In Substage 86, regarding the inside diameter of the work $1a$, the center of the minimum circle in the circles including a dodecagon formed by connecting the measuring points ($P_{I,1}$-$P_{I,12}$) in the 12 phases of each section, its vector, and the radius of a circle which permits the choice of the real center position (the radius being hereinafter referred to as the "permissible radius of circle") are found to obtain the secondary virtual center. The calculation procedure will now be explained.

(a') In each of J sections ($J_1$-$J_8$), the center of gravity is determined as the mean of coordinate values at the measuring points $P_{I,1}$-$P_{I,12}$ in 12 phases. A total of eight gravity-center coordinates, one for each section, are obtained.

(b') In case where a product having an outside or inside diameter of about one meter is to be obtained, (9×9) points are provided in a lattice pattern at intervals of 5 mm over an area 40 mm by 40 mm about the center of gravity. The distances from each intersection of the lattice to the measuring points $P_{I,1}$-$P_{I,12}$ in each phase are found. Thus, from each lattice point twelve different distances are obtained. They form one group, and a total of 81 groups are obtained per section. Then, the maximum distances of the respective groups are compared, and the lattice point of the minimum distance is found. A total of eight such lattice points are obtained.

(c') Over an area 5 mm by 5 mm about each lattice point located in (b') above, (11×11) points are set in a lattice pattern at intervals of 0.5 mm. By the same procedure as followed in (b') above, the lattice point is found. Thus, a total of eight such lattice points are obtained, one per section.

(d') The coordinate value of the lattice point found in (c') above substantially coincides with the center of the minimum circle in the section and is taken as a vector $V_{I,Jn}(X_{I,Jn}, Y_{I,Jn}, Z_{I,Jn})$. Thus, a total of eight such center vectors are obtained.

(e') The permissible radius of circle is taken as a value $R_{I,Jn}$ obtained by subtracting the inner radius of the finished piece from the radius of the minimum circle. A total of eight permissible radii are obtained, one for each section. Where the $R_{I,Jn}$ is minus or zero, it is regarded as "1" for the convenience of calculation.

These calculations are all performed by an electronic computer.

In Substages 82 and 87, the center vectors $V_{M,n}$, $V_{M,n+1}$, $V_{M,n+2}$ ($n=1, 6$, $M=O, I$) of the outside and inside diameters in the three sections $J_n$, $J_{n+1}$, $J_{n+2}$ ($n=1, 6$) at the both ends of the work are found. The calculations are made in the following way.

(a) From the center vectors of the three sections at the both ends, $V_{M,n}$, $V_{M,n+1}$, $V_{M,n+2}$, and from the permissible radii $R_{M,Jn}$, $R_{M,Jn+1}$, $R_{M,Jn+2}$, the weighted mean vectors of the left-hand and right-hand blocks, $V_{M,L}$, $V_{M,R}$, are calculated according to the following set of equations:

$$X_{M, L \text{ or } R} = \frac{R_{M,Jn+1} \cdot R_{M,Jn+2}}{Q_M} X_{Jn} + \frac{R_{M,Jn} \cdot R_{M,Jn+2}}{Q_M} X_{Mn+1}$$
$$- \frac{R_{M,Jn+1} \cdot R_{M,Jn}}{Q_M} X_{Jn+2}$$

$$Y_{M, L \text{ or } R} = \frac{R_{M,Jn+1} \cdot R_{M,Jn+2}}{Q_M} Y_{Jn} + \frac{R_{M,Jn} \cdot R_{M,Jn+2}}{Q_M} Y_{Jn+1}$$
$$- \frac{R_{M,Jn+1} \cdot R_{M,Jn}}{Q_M} Y_{Jn+2}$$

$$Z_{M, L \text{ or } R} = \frac{R_{M,Jn+1} \cdot R_{M,Jn+2}}{Q_M} Z_{Jn} + \frac{R_{M,Jn} \cdot R_{M,Jn+2}}{Q_M} Z_{Jn+1}$$
$$- \frac{R_{M,Jn+1} \cdot R_{M,Jn}}{Q_M} Z_{Jn+2}$$

where $Q_M = R_{M,Jn} \cdot R_{M,Jn+1} + R_{M,Jn+1} \cdot R_{M,Jn+2}$
$+ R_{M,Jn+2} \cdot R_{M,Jn}$
($M = L, R, n = 1, 6$)

In this way two vectors $V_{O,L}$, $V_{I,L}$, which are weighted mean vectors of the outside and inside diameters of the left-hand block and two vectors $V_{O,R}$, $V_{I,R}$ of the outside and inside diameters of the right-hand block are obtained.

In Substage 83, the secondary virtual center is found from the four weighted mean vectors $V_{OL}$, $V_{IL}$, $V_{OR}$, $V_{IR}$ obtained in Substages 82 and 87. The calculation procedure is as follows:

(a) As shown in FIG. 6, a vector $V_L$ for interior division of the weighted mean vectors of the outside and inside diameters of the left-hand block, $V_{OL}$, $V_{IL}$, into the left-hand block mean of the permissible outside-diameter radii, $R_{OL}$, and the left-hand block mean of the permissible inside-diameter radii, $R_{IL}$, and a vector $V_R$ for interior division of the weighted mean vectors of the outside and inside diameters of the right-hand block, $V_{OR}$, $V_{IR}$, into the right-hand block mean of the permissible outside-diameter radii, $R_{OR}$, and the right-hand block mean of the permissible inside-diameter radii, $R_{IR}$, are obtained by calculations according to the equations:

$$V_L = \frac{R_{IL} \cdot V_{OL} + R_{OL} \cdot V_{IL}}{R_{IL} + R_{OL}}$$

$$V_R = \frac{R_{IR} \cdot V_{OR} + R_{OR} \cdot V_{IR}}{R_{IR} + R_{OR}}$$

where $R_{OL} = (R_{O,1} + R_{O,2} + R_{O,3})/3$ $R_{IL} = (R_{I,1} + R_{I,2} + R_{I,3})/3$ $R_{OR} = (R_{O,6} + R_{O,7} + R_{O,8})/3$ $R_{IR} = (R_{I,6} + R_{I,7} + R_{I,8})/3$ (b) The axis connecting the terminating points of the two vectors $V_L$, $V_R$ thus obtained is regarded as the secondary virtual center.

Substage 84 is for an identification process whereby the procedure of Substages 81–83, 86 and 87 are followed all over again for added accuracy.

In Substage 85, coordinate transformation of the measured values ($P_{O,1}$–$P_{O,12}$, $P_{I,1}$–$P_{I,12}$) and the like is performed so that the secondary virtual center may be a new Z'-axis. The calculation procedure will be described below with reference specifically to FIG. 6.

(a) From the weighted mean vectors $V_L$, $V_R$ of the blocks at the both ends of the work, the $\sin \alpha$, $\cos \alpha$, $\sin \beta$, $\cos \beta$ necessary for the coordinate transformation are calculated using the equations:

$$\sin \alpha = \frac{Y_R - Y_L}{\sqrt{(Y_R - Y_L)^2 + (z_R - z_L)^2}}$$

$$\cos \alpha = \frac{z_R - z_L}{\sqrt{(x_R - x_L)^2 + (z_R - z_L)^2}}$$

$$\sin \beta = \frac{x_R - x_L}{\sqrt{(x_R - x_L)^2 + (z_R - z_L)^2}}$$

$$\cos \beta = \frac{z_R - z_L}{\sqrt{(x_R - x_L)^2 + (z_R - z_L)^2}}$$

(b) The point $S_{Jn}(X_{Jn}, Y_{Jn})$ where the plane including the $J_n$ section, $Z = Z_{Jn}$ (n=1–8), intersects with the Z'-axis (secondary virtual center) is calculated as:

$$X_j = \frac{(x_R - x_L)(z_j - z_L)}{z_R - z_L} + x_L$$

$$Y_j = \frac{(y_R - y_L)(z_j - z_L)}{z_R - z_L} + y_L$$

(c) All the measured values $(X_{Jn}, Y_{Jn}, Z_{Jn})$ ($J_n$=1–8) of the $J_n$ section are subjected to coordinate transformation according to the following equations to find ($X'_{Jn}$, $Y'_{Jn}$, $Z'_{Jn}$).

$X'_{Jn} = (X_{Jn} - X_{Jn}) \cos \beta$ $Y'_{Jn} = (Y_{Jn} - X_{Jn}) \cos \alpha - (X_{Jn} - X_{Jn}) \sin \alpha \sin \beta$ $Z'_{Jn} = Z_{Jn}$ (d) Likewise, the locations of virtual center at the both end faces of the work are transformed into locations of a coordinate system using the secondary virtual center as the new Z'-axis.

Following the coordinate transformation above described, the work is passed once again through Substages 81–83, 86 and 87 and measured in a titled position as indicated in FIG. 7. In the repeated process of Substage 81 a larger maximum circle is obtained for the outside diameter and a smaller minimum circle is obtained for the inside diameter. Accordingly, the permissible circle of each section is enlarged, broadening the range for choice of the center.

In Stage 9 the real center is obtained from the secondary virtual center. As is obvious from FIG. 8, the real center to be found here is parallel to the secondary virtual center 905 and passes through a region in which the permissible circles of the eight sections overlap. If the real center does not pass this region, it follows that there is no ample allowance for the work to be machined to the desired shape.

Within the center region 902 that satisfies the conditions defined above, the center where the dispersion of machining allowances at all the measuring points is uniform is regarded as the real center 904. The procedure for calculation is as follows:

(a) From within a square 901 circumscribed with a permissible circle 903 having the minimum radius in all the sections, lattice points $U_k$ ($x_k$, $y_k$) at intervals of 5 mm are taken out.

(b) Whether those points are within all the permissible circles or not is determined according to the formula $R^2_{M,Jn} \geq (x_{m,Jn} - x_k)^2 + (y_{M,Jn} - y_k)^2$ where $R_{M,Jn}$ is the permissible radius of circle of the Jn section and ($x_{M,Jn}$, $y_{M,Jn}$) are center vectors of the Jn section.

(c) If not a single point satisfies the condition (b) above, then the lattice intervals are reduced to one millimeter each.

(d) If the condition is still unsatisfied in (c), then the secondary virtual center is used as the real center.

(e) Of the points that satisfy the condition (b) or (c), the point where the dispersions of machining allowances at all the measuring points $P'_{O,1}$–$P'_{O,12}$, $P'_{I,1}$–$P'_{I,12}$ ($Z_{M,Jn}$, $X_{m,Jn}$, $Y_{m,Jn}$) become uniform, that is, the value of ($X_k$, $Y_k$) which makes $\sigma^2$ in the equation below the smallest, is calculated using the equation $T_{M,Jn} = \sqrt{(X_{M,Jn} - x_k)^2 + (Y_{M,Jn} - Y_k)^2} - R_M$ where $R_M$ is the radius of the desired contour of the finished piece.

Next, the dispersion $\sigma^2$ is calculated with the equation $$\sigma^2 = \frac{1}{2Jn} \sum_{\substack{M = O,I \\ Jn = 1-8}} (T_{M,Jn}' - \overline{T})^2$$

where $\overline{T}$ is the mean value of the machining allowances.

(f) A center that passes the point obtained in (e) and is parallel to the secondary virtual center is deemed as the real center.

(g) The machining allowances at all measuring points relative to the real center are calculated.

In Stage 10 the work is judged finishable to the desired contours if all the finishing allowances calculated in Stage 9 are not less than predetermined minimum allowances, and not finishable if any allowance is less than the predetermined value.

In Stage 11 the possibility of machining to the desired contours, real center positions at both end faces of the work, and the machining allowances and measurements in all sections and all phases are output from the computer.

Conversely, in Stage 12, the impossibility of machining to the desired contours, the positions where the machining allowances are insufficient, and the machining allowances and measurements in all sections and all phases are output.

In Stage 13 the finished diameters of the work as machined to the desired contours are changed, whereby the work can be centered without the necessity of repeating the measurements above described.

In Stage 14 the real center points at the both ends of the work are marked off by a center drill. Positioning the center drill is done manually by the operator while watching the scale.

As will be clear from the foregoing description, it is possible in accordance with this invention to machine workpieces to desired contours under favorable turning conditions with uniformity in machining allowances and thus obtain finished pieces of good quality in extremely high yields.

What is claimed is:

1. A method for centering a hollow cylindrical workpiece having a longitudinal dimension comprising the steps of; selecting a plurality of cross-sectional planes extending generally perpendicular to said longitudinal dimension of said workpiece at spaced apart locations therealong; utilizing outside and inside diameter measuring instruments to measure the outside and inside diameters and contours of said hollow cylindrical workpiece relative to a center line of said instruments taken as a virtual center of the workpiece, said measurements being taken for each of said selected plurality of cross-sectional planes; effecting corrections in said measurements to compensate for deflection of said workpiece and for error arising from the instruments themselves; compiling said measurements as stored information; and calculating on the basis of said stored information the real center of said hollow cylindrical workpiece; whereby the location of said real center and machining allowances necessary for obtaining a product finished to desired contours can be computed.

* * * * *